United States Patent [19]
Ichihara et al.

[11] Patent Number: 5,457,508
[45] Date of Patent: Oct. 10, 1995

[54] DISPLAY DEVICES

[75] Inventors: Taku Ichihara; Masami Ikeda; Yeu Murakami, all of Tokyo, Japan

[73] Assignee: Dentsu Prox Inc., Tokyo, Japan

[21] Appl. No.: 341,192

[22] Filed: Nov. 18, 1994

[51] Int. Cl.$^6$ .................................................. G03B 21/00
[52] U.S. Cl. ................. 353/10; 353/30; 353/94; 359/451; 359/629; 359/479
[58] Field of Search ..................... 353/7, 10, 30, 353/37, 77, 94, 98, 99; 434/285, 287; 359/451, 449, 458, 466, 471, 475, 477, 478, 479, 629, 630; 352/86

[56] References Cited

U.S. PATENT DOCUMENTS

| | | | |
|---|---|---|---|
| 2,299,682 | 10/1942 | Conant | 359/451 |
| 3,317,206 | 5/1967 | Holt | 353/10 |
| 4,736,214 | 4/1988 | Rogers | 353/30 |
| 4,738,522 | 4/1988 | Lunde et al. | 353/30 |
| 5,255,028 | 10/1993 | Biles | 353/30 |
| 5,276,524 | 1/1994 | Inoue et al. | 353/37 |

*Primary Examiner*—William A. Cuchlinski, Jr.
*Assistant Examiner*—William C. Dowling
*Attorney, Agent, or Firm*—Wenderoth, Lind & Ponack

[57] ABSTRACT

A display device includes a projector and a translucent hemispherical screen disposed in a black box, with the axis of the hemisphere extending perpendicular to a surface on which an image from the projector is cast. A semitransparent mirror is disposed on the opposite side of the image-receiving surface of the hemispherical screen, aslant to the axis of the hemisphere and opposite a viewer. The image of an spherical object projected on the hemispherical screen can be seen in stereoscopic spatial vision. The image viewed through the semitransparent mirror appears as if it was floating in space.

8 Claims, 2 Drawing Sheets

DISPLAY DEVICES

BACKGROUND OF THE INVENTION

This invention relates to display devices used for learning, entertainment, information, advertisement, etc.

The earth and other celestial bodies, men, animals, plants and many other objects are often displayed as spherical images on color television receivers. In weather forecasts, for example, live data sent from meteorological satellites and image-processed by computers are broadcast through televisions to show how the movement of clouds changes with time. Topographic features reproduced on the basis of live data from artificial satellites are also represented by using an image of the earth rotating about its axis.

Computer graphics representing the constellations of different seasons are also shown on color displays. Planetariums show the stars and planets in the whole sky on their dome-shaped screens.

The whole image of the earth or other spherical objects have conventionally been displayed on the flat surface of color television or other displays that cannot give a stereoscopic or floating effect.

The planetariums project constellations on concave surfaces. Being large-sized and costly, they are not suited for viewing seasonal changes in constellations on a smaller scale.

SUMMARY OF THE INVENTION

The object of this invention is to provide display devices that show objects with a stereoscopic, spatial or concave effect.

A display device according to this invention comprises projector, a translucent hemispherical screen that is disposed so that the axis of the hemisphere thereof lies perpendicular to a surface on which the projector casts an image, and a semitransparent mirror disposed opposite to the hemispherical screen, aslant to the axis of the hemisphere and in front of a viewer.

An image formed on a sphere or a concave surface is projected on the hemispherical screen, with the diameter of the image maintained substantially equal to that of the screen. While the image formed on a sphere is projected on the concave surface of the hemispherical screen, the image formed on a concave surface is projected on the convex surface thereof. The viewer sees the image appearing on the hemispherical surface in stereoscopic vision because of the effect of parallax between two eyes.

The projector is a liquid-crystal or other type of projector connected to a videotape recorder, videodisc player, computer or other similar device. The projected images are those of the earth or other celestial bodies (as images on the convex surface) or constellations on celestial globes (as images on the concave surface) recorded on videotapes, videodiscs or movie films. Information on the earth and so forth stored in a computer may be displayed with the projected images. When accurate reproduction of the topography of the earth is required, for example, an image is prepared by viewing a sphere from a great enough distance, as though it were at infinity, with the space between the parallels and meridians decreasing as the distance from the center of the circle. Images may be either still or motion pictures. The hemispherical screen is made of plastic that is made translucent by applying a suitable paint or milky-white plastic or by abrasive blasting. The diameter of the hemispherical screen ranges, for example, from 20 cm to several meters. The appropriate gain of the screen is 2.0 to 1.0 when the viewer stands at right angles with the screen and 1.0 to 0.2 when the angle therebetween is 45 degrees.

It is appropriate for the semitransparent mirror to have a transmittivity of 30 to 60% and a reflectivity of 30 to 50%, and lie aslant to the axis of the hemisphere at an angle of 45 to 135 degrees.

A display device according to this invention also comprises a black box having an observation window made by cutting open a part of a front face thereof, a translucent hemispherical screen disposed in the box so that the image from the projector is projected on the convex or concave surface thereof, and a semitransparent mirror disposed on the opposite side of the image-receiving surface of the hemispherical screen, aslant to the axis of the hemisphere and opposite the observation window.

Furthermore, a display device according to this invention also comprises a black box shaped like a rectangular parallelepiped and having an observation window in each of four vertical faces, thereof translucent hemispherical screens disposed in the box and below respective of the observation windows so that images from respective projectors are projected on convex or concave surface thereof, and semitransparent mirror disposed on the opposite side of the image-receiving surface of each hemispherical screen, aslant to the axis of the respective hemisphere and opposite each observation window.

DETAILED DESCRIPTION OF THE INVENTION

Figure 1:
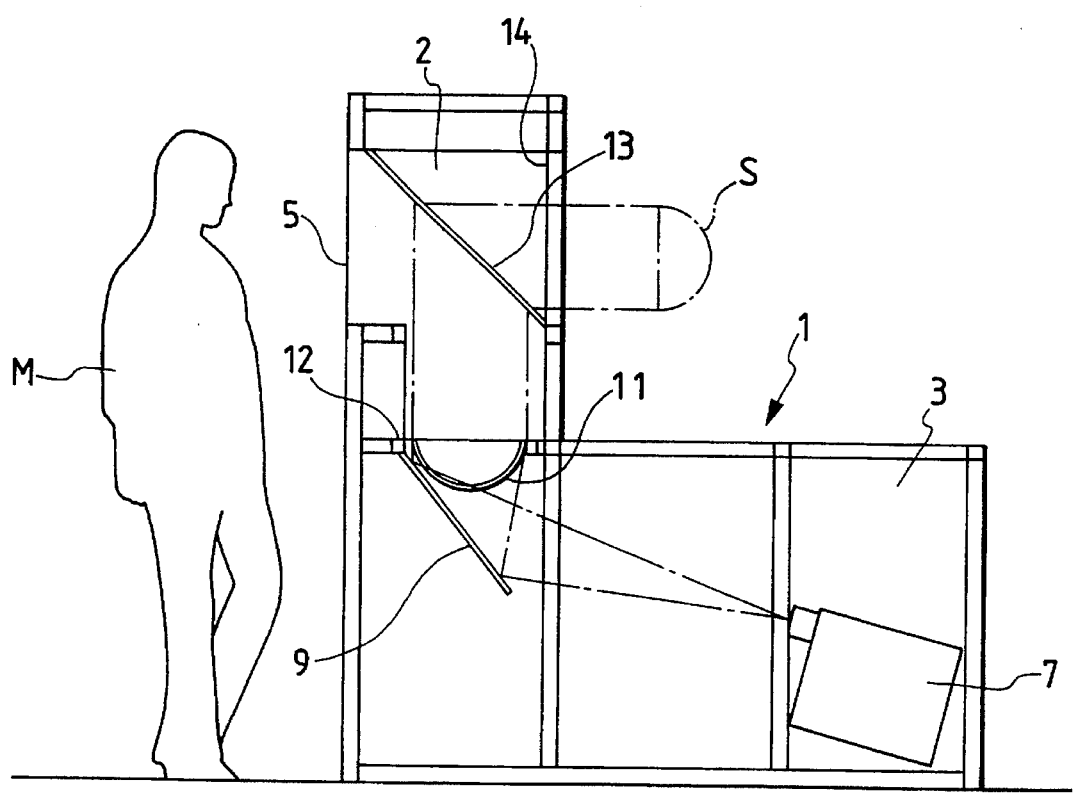
FIG. 1 is a vertical cross-sectional view of a display device according to this invention.

FIG. 1 is a vertical cross-sectional view of a display device according to this invention that shows seasonal changes in constellations.

The display device comprises a black box 1 that has an observation window 5 made by cutting open a part of the front face thereof.

A liquid-crystal projector 7 is placed in the rear part of the black box 1. The liquid-crystal projector 7 is connected to a videotape recorder for playing a videotape of the constellations in the whole sky or a videodisc player for playing a similar videodisc or a computer for displaying graphics or information on the constellations (not shown). The recorded images of the constellations are prepared by computer graphics.

A forwardly tilted first reflecting mirror 9 is disposed in the front part of the black box. The first mirror 9 is tilted approximately 60 degrees with respect to the horizontal plane.

A hemispherical screen 11 is disposed directly above the first reflecting mirror 9, with the axis of the hemisphere extending vertically. Therefore, the axis of the hemisphere lies perpendicular to a surface on which an image from the projector is cast. The convex side of the hemispherical screen 11 faces the first reflecting mirror 9. The hemispherical screen 11 is made of milky white plastic. An annular mask 12 surrounds the upper end of the hemispherical screen 11 to ensure that only the necessary portion of an image reaches a viewer M. The liquid-crystal projector 7 is preset so that the diameter of an image projected on the hemispherical screen 11 is substantially equal to the diameter of the screen 11. The hemispherical screen 11 of this embodiment has a diameter of 30 cm.

A forwardly tilted second reflecting mirror 13 facing the observation window 5 is disposed above the hemispherical screen 11. The second reflecting mirror 13 is a semitransparent mirror tilted at an angle of approximately 45 degrees with respect to the horizontal plane. A black background 14 is placed on that side of the semitransparent mirror 13 which is opposite the viewer M. The reflectivity and transmittivity of the semitransparent mirror 13 are 30% and 45%, respectively.

In the display device described above, the first reflecting mirror 9 reflects an image from the liquid-crystal projector 7 onto the hemispherical screen 11. Then, the second reflecting mirror 13 reflects the image on the hemispherical screen 11 to the viewer M who sees an image S of the constellations in the sky through the observation window 5. The viewer M sees the image appearing on the hemispherical surface in stereoscopic vision, as if the constellations are in a concave sky, because of the effect of parallax between two eyes.

Figure 2:
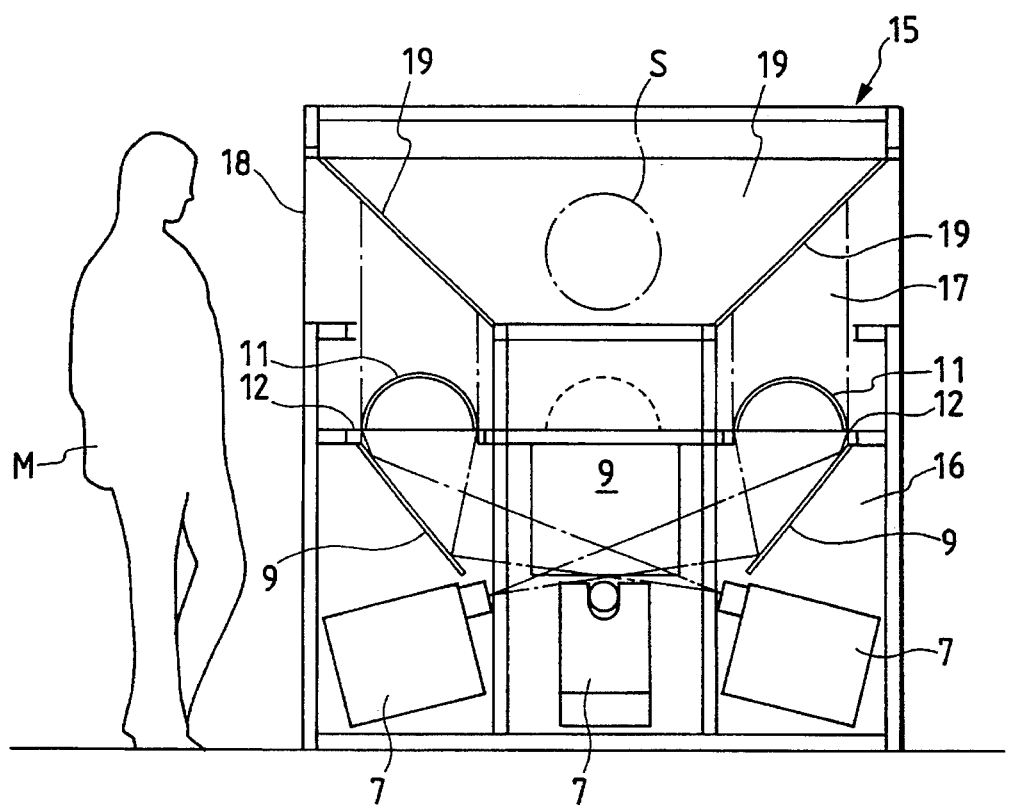
FIG. 2 is a vertical cross-sectional view of another display device according to this invention.
Figure 3:
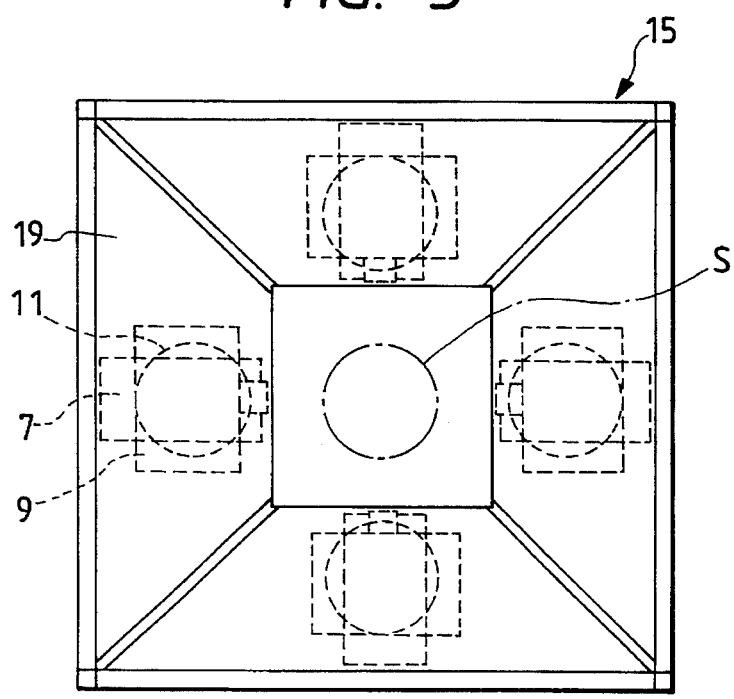
FIG. 3 is a horizontal cross-sectional view of the display device shown in FIG. 2.

FIGS. 2 and 3 show another embodiment of this invention that is suited for showing the weather or other conditions of the earth. The parts and devices similar to those in the embodiment shown in FIG. 1 are denoted by the same reference characters, with detailed description thereof omitted.

A black box 15 is shaped like a rectangular parallelepiped, with four liquid-crystal projectors 7 disposed in the lower part thereof, each projector being placed on the inside of each face of the black box. As in the first embodiment described above, each liquid-crystal projector 7 is combined with a respective first reflecting mirror 9, a respective hemispherical screen 11, and a respective second reflecting mirror 19 that is semitransparent. The concave surface of each hemispherical screen 11 faces the respective first reflecting mirror 9. The reflectivity and transmittivity of the semitransparent mirror 19 are 30% and 45%, respectively. Each semitransparent mirror 19 is tilted at an angle of 45 degrees with respect to the horizontal plane. The four semitransparent mirrors 19 are fit, one next to another, in the upper part of the black box 15. The black box 15 has four observation windows 18, a respective window 18 facing each semitransparent mirror 19. Computer graphics showing the weather conditions of the earth, which are prepared based on data sent from meteorological satellites, are recorded in the tape set in a videotape recorder connected to the liquid-crystal projector 7.

This embodiment permits multiple viewers M to see the image on all sides of the black box 15. A viewer M sees an image S of the earth as if it were floating between two opposite semitransparent mirrors 19. Such viewer M also sees another viewer M on the opposite side and the surrounding scene through another set of two opposite semitransparent mirrors 19. Accordingly, the image of the earth appears as if it existed between the two viewers M standing on opposite sides of the black box, with the effect of floating in the space more pronounced.

The image from the liquid-crystal projector 7 may also be cast directly on the hemispherical screen 11, instead of being cast by way of the first reflecting mirror 9 as in the embodiment just described.

The display devices according to this invention project an image of a spherical object on a hemispherical screen for viewing through a semitransparent mirror. The images thus reproduced appeal greatly to viewers with their stereoscopic, spatial or concave effect. By reversing the hemispherical screen, the image on a convex surface can be easily switched to one on a concave surface, and vice versa. Because the image is viewed through a semitransparent mirror, the background surrounding the hemispherical mirror merges into the background opposite to the viewer. This makes the background around the hemispherical screen less conspicuous and the spatiality of the image of a projected spherical object more pronounced than the one viewed directly on the hemispherical screen.

What is claimed is:

1. A display device comprising:
    a translucent hemispherical screen disposed with the axis of the hemisphere thereof extending perpendicular to a surface on which an image from a projector is cast; and
    a semitransparent mirror disposed on the opposite side of the image-receiving surface of said hemispherical screen, aslant to said axis of said hemisphere and opposite a viewer.

2. A display device according to claim 1, in which the image is cast on a concave surface of said hemispherical screen.

3. A display device according to claim 1, in which the image is cast on a convex surface of said hemispherical screen.

4. A display device according to claim 1, in which said hemispherical screen is made of a milky-white translucent material.

5. A display device according to claim 1, in which the projector casts an image directly onto said hemispherical screen.

6. A display device according to claim 1, in which the projector casts an image onto said hemispherical screen through a reflecting mirror.

7. A display device comprising:
    a black box having an observation window made by cutting open a part of a front face thereof;
    a translucent hemispherical screen disposed in said black box, with the axis of the hemisphere thereof extending perpendicular to a surface on which an image from a projector is cast; and
    a semitransparent mirror disposed on the opposite side of the image-receiving surface of said hemispherical screen, aslant to said axis of said hemisphere and opposite said observation window.

8. A display device comprising:
    a rectangular parallelepiped black box having an observation window cut in each of four vertical faces thereof;
    a translucent hemispherical screen disposed below each respective observation window in said black box, with the axis of the hemisphere thereof extending perpendicular to a surface on which an image from a projector is cast; and
    a semitransparent mirror disposed on the opposite side of the image-receiving surface of each respective hemispherical screen, aslant to said axis of said hemisphere and opposite each respective observation window.

\* \* \* \* \*